United States Patent [19]

Farrow

[11] 4,330,699
[45] May 18, 1982

[54] LASER/ULTRASONIC WELDING TECHNIQUE

[75] Inventor: Michael M. Farrow, Boulder, Colo.

[73] Assignee: The United States of America as represented by the Secretary of the Navy, Washington, D.C.

[21] Appl. No.: 61,350

[22] Filed: Jul. 27, 1979

[51] Int. Cl.³ .............................................. B23K 26/00
[52] U.S. Cl. ...................... 219/121 LD; 219/121 LA; 219/121 LC; 228/110
[58] Field of Search ..... 219/121 L, 121 LA, 121 LB, 219/121 LC, 121 LD, 121 LM, 121 LS, 121 LT; 228/110

[56] References Cited

U.S. PATENT DOCUMENTS

| 3,297,876 | 1/1967 | De Maria | 219/121 LB X |
| 3,477,119 | 11/1969 | Smith | 228/110 |
| 3,503,804 | 3/1970 | Schneider | 219/121 L X |
| 3,588,440 | 6/1971 | Morse | 219/121 LA X |
| 3,931,921 | 1/1976 | Antonevich | 228/1 R |
| 4,015,221 | 3/1977 | Dalton | 219/121 L X |
| 4,023,005 | 5/1977 | Bolin | 219/121 LD |
| 4,152,575 | 5/1979 | Banas | 219/121 LA X |

FOREIGN PATENT DOCUMENTS

| 49-15331 | 4/1974 | Japan | 228/110 |
| 52-57044 | 5/1977 | Japan | 228/110 |

Primary Examiner—Gene Z. Rubinson
Assistant Examiner—Keith E. George
Attorney, Agent, or Firm—R. S. Sciascia; Charles D. B. Curry; Francis I. Gray

[57] ABSTRACT

A non-contact laser/ultrasonic welding technique for strengthening the common laser weld by the addition of ultrasonic cavitation and cleaning. A high powered laser applies heat to a weld joint to produce a melt. The output of the laser, or a second laser, is amplitude modulated to generate acoustic waves in the melt. The improved interdiffusion of the melt and the homogeneity of the weld joint result in an improved quality laser weld.

12 Claims, 5 Drawing Figures

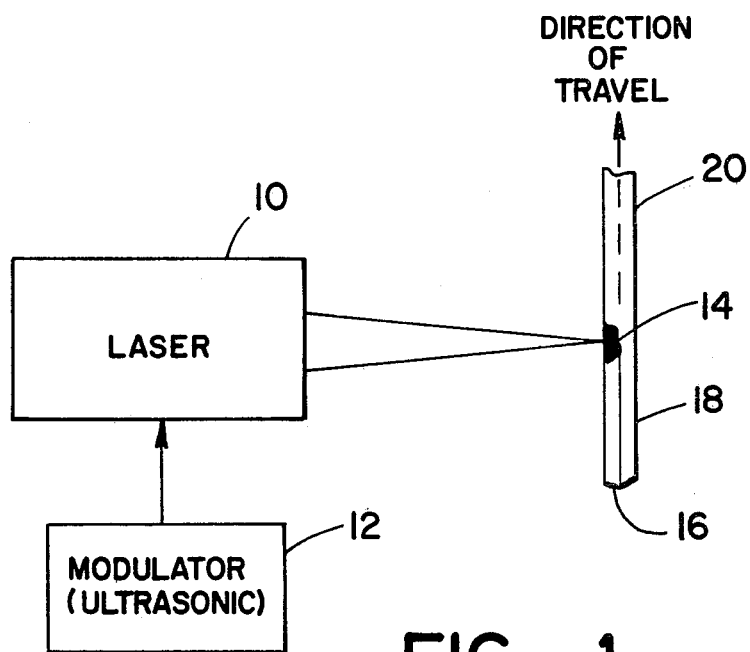
FIG_1
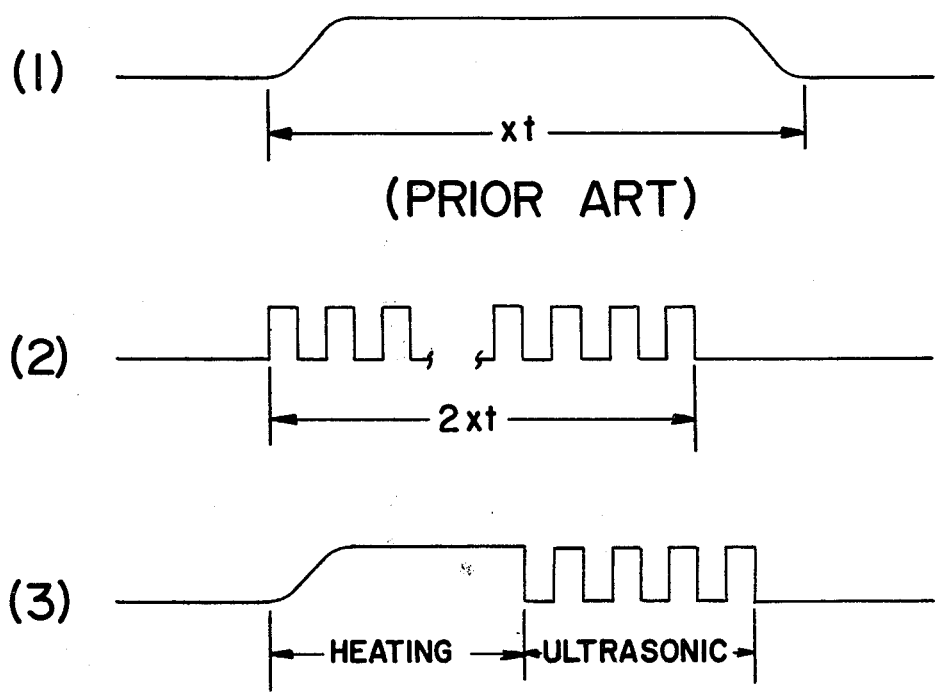
FIG_2

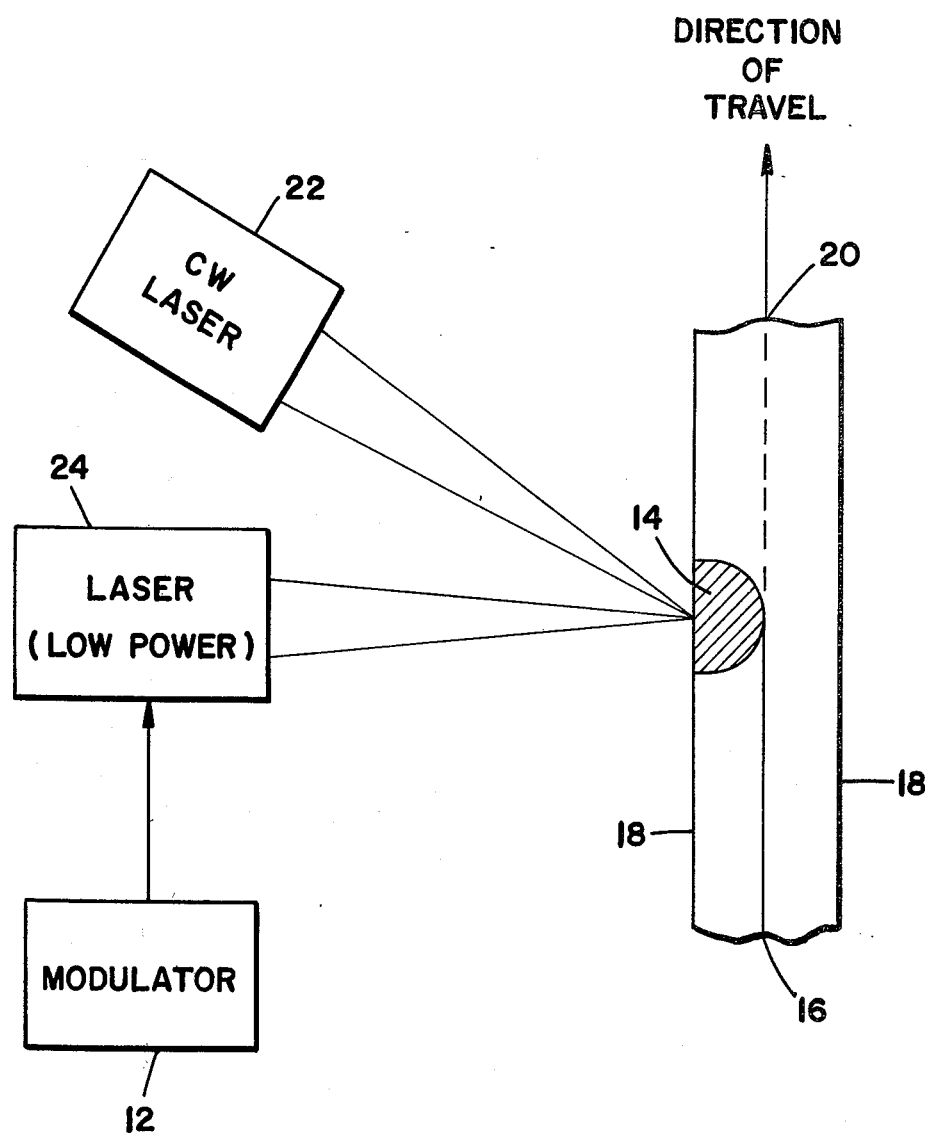
FIG_3

LASER/ULTRASONIC WELDING TECHNIQUE

BACKGROUND OF THE INVENTION

1. Field of the Invention

The present invention relates to welding techniques, and more particularly to a non-contact welding technique which combines laser and ultrasonic welding.

2. Description of the Prior Art

Within the past twenty-five years two new techniques of welding—laser welding and ultrasonic welding—have been developed. The unique attributes of laser welding are apparent, particularly since the advent of the high powered continuous wave $CO_2$ devices. However, ultrasonic welding, though older, has not achieved the popularity of the laser technique, although it also has unique attributes.

It has been pointed out that even fluxless soldering of aluminum is possible if the electrically heated soldering tip is driven with an ultrasonic wave. The vibrations of the soldering tip produce cavitation in the solder, thus cleaning the surface of the work and removing oxide coatings. Unfortunately, the application of high powered ultrasonics alone, like the laser techniques, is confined to joining relatively thin plates ($\frac{1}{4}''$) and sheets, spot welding and welding plastics.

SUMMARY OF THE INVENTION

Accordingly the present invention provides a non-contact laser/ultrasonic welding technique for strengthening the common laser weld by the addition of the ultrasonic cavitation and cleaning. A high powered laser applies heat to a weld joint to produce a melt. The output of the laser, or a second laser, is amplitude modulated to generate acoustic waves in the melt. The improved interdiffusion of the melt and the homogeneity of the weld joint result in an improved quality laser weld.

Therefore, it is an object of the present invention to provide an improved quality laser weld joint with a non-contact welding technique.

Another object of the present invention is to combine the advantages of laser welding and ultrasonic welding into a single technique to produce higher quality weld joints.

Other objects, advantages and novel features of the present invention will be apparent from reading the following description in conjunction with the attached drawing and appended claims.

BRIEF DESCRIPTION OF THE DRAWING

FIG. 1 is a block diagram of a non-contact laser welding system according to the present invention.

FIG. 2 is a timing diagram illustrating welding pulses for (1) prior art laser welding, (2) ultrasonic laser welding, and (3) ultrasonic laser welding for a portion of the welding cycle.

FIG. 3 is a block diagram of another embodiment for a non-contact laser welding system according to the present invention.

DESCRIPTION OF THE PREFERRED EMBODIMENT

Acoustic waves of any frequency may be generated in a solid by allowing a modulated optical beam to illuminate a solid if a portion of the beam is absorbed by the solid. Current laser welding techniques can be improved by inducing acoustic waves in the melt of a weld joint. This may be accomplished by vibrating the weld joint at an ultrasonic frequency. However, preferably the typically one to six millisecond weld pulses from a high powered laser may be amplitude modulated at a convenient ultrasonic frequency. Doubling the weld pulse length as shown in FIG. 2 for a 50% duty cycle provides the same amount of energy to the weld joint. But the effect is to generate an intense acoustic field in the melt which aids in the interdiffusion of the melt and in the homogeneity of the weld joint.

As shown in FIG. 1 a high powered laser 10, such as a 20 Kwatt $CO_2$ CW laser, may be modulated from 80% to 100% at an ultrasonic frequency ranging between 25 KHz and 100 KHz using square wave modulation by a modulator 12, such as by an intracavity rotating mirror. The laser 10 forms a melt 14 at the weld joint 16 of the two solids 18 to be joined. The dotted line 20 indicates the completed weld. With a 50% duty cycle the same total amount of energy is applied to the weld joint with a weld pulse twice as long as without such modulation to make a comparable weld.

Pulsed lasers may be used in lieu of a CW laser. For example if a "spot" weld is to be made with a single (or even repetitive) 10 msec pulse(s), then a pulse, or pulses, having a 25 KHz square wave modulation at a 50% duty cycle lasting 20 $\mu$sec will result in an improved weld.

Alternatively, the weld joint may be heated first with an unmodulated pulse for some fraction of the total pulse width, with the last portion of the pulse width being modulated at the acoustic frequency as shown in FIG. 2, thus reducing the weld time in comparison with a weld pulse modulated throughout the pulse width. Also as shown in FIG. 3 a second high powered laser 12 may be used to heat the weld joint while a lower powered laser 24 is modulated to provide the improved weld joint in approximately the same or less time as current laser welding techniques. The additional advantage of the latter technique is that, since the efficiency of conversion of sound waves depends on rise time, the faster the rise time the better. But this tends to blast the surface and generate a reflective plasma if done at high CW power levels. Using the second laser for initial heating and melting of the weld zone followed by the ultrasonically modulated "sound" laser generates a reflective plasma without decoupling the heating pulse from the surface. Two different wavelengths for the two lasers proves advantageous so that the plasma generated by the heating pulse is transparent to the acoustic generating pulse.

Thus, the present invention provides a welding technique suitable for a range of applications from microminiature welding, such as leads for integrated circuits, to macro attachments, such as gross welds, which produces an improved interdiffusion of the melt and homogeneity of the weld joint.

What is claimed is:

1. An improved method for non-contact laser welding having the step of heating a weld joint with a high powered laser to form a melt, the improvement comprising the step of inducing ultrasonic waves in said melt to aid in the interdiffusion of said melt and the homogeneity of said weld joint wherein said inducing step comprises amplitude modulating at an ultrasonic frequency the output of said high powered laser to generate said ultrasonic waves.

2. An improved non-contact laser welding method as recited in claim 1 wherein said inducing step comprises amplitude modulating at an ultrasonic frequency the output of said high powered laser for a part of the weld cycle.

3. An improved method for non-contact laser welding having the step of heating a weld joint with a high powered laser to form a melt, the improvement comprising the step of inducing ultrasonic waves in said melt to aid in the interdiffusion of said melt and the homogeneity of said weld joint wherein said inducing step comprises amplitude modulating at an ultrasonic frequency the output of a second laser to generate said ultrasonic waves.

4. An improved non-contact laser welding method as recited in claim 3 wherein said amplitude modulating step comprises square wave modulating the output of said second laser, said second laser having a different lasing frequency than that of said high powered laser so that the reflective plasma produced by said heating step is transparent to the output of said second laser.

5. A method for non-contact laser welding comprising the steps of:
(a) heating a weld joint with a high powered laser to form a melt;
(b) inducing ultrasonic waves in said melt to aid the interdiffusion of said melt and the homogeneity of said weld joint; wherein
(c) said inducing step comprises amplitude modulating at an ultrasonic frequency the output of said high powered laser to generate said ultrasonic waves.

6. A method for non-contact laser welding as recited in claim 5 wherein said amplitude modulating step comprises modulating said high powered laser for a part of the weld cycle.

7. A method for non-contact laser welding comprising the steps of:
(a) heating a weld joint with a high powered laser to form a melt;
(b) inducing ultrasonic waves in said melt to aid the interdiffusion of said melt and the homogeneity of said weld joint; wherein
(c) said inducing step comprises amplitude modulating at an ultrasonic frequency the output of a second laser focused on said melt to generate said ultrasonic waves.

8. A method for non-contact welding as recited in claim 7 further comprising the step of operating said second laser at a frequency at which the reflective plasma generated by said heating is transparent.

9. A non-contact laser welding system comprising:
(a) a high powered laser for heating a weld joint to form a melt;
(b) means for inducing ultrasonic waves in said melt to aid the interdiffusion of said melt and the homogeneity of said weld joint; wherein
(c) said inducing means comprises means for amplitude modulating at an ultrasonic frequency the output of said high powered laser to generate said ultrasonic waves.

10. A non-contact laser welding system as recited in claim 9 wherein said amplitude modulating means comprises means for square wave modulating said high powered laser for a part of the weld cycle.

11. A non-contact laser welding system comprising:
(a) a high powered laser for heating a weld joint to form a melt;
(b) means for inducing ultrasonic waves in said melt to aid the interdiffusion of said melt and the homogeneity of said weld joint; wherein
(c) said inducing means comprises a second laser focused on said melt; and means for amplitude modulating at an ultrasonic frequency the output of said second laser to generate said ultrasonic waves.

12. A non-contact laser welding system as recited in claim 1 wherein said second laser comprises a laser having an operating frequency different from that of said high powered laser such that the reflective plasma generated by said high powered laser in heating said melt is transparent to the output of said laser.

* * * * *